(12) United States Patent
Hu et al.

(10) Patent No.: US 6,471,389 B2
(45) Date of Patent: Oct. 29, 2002

(54) DYNAMIC DELAY CURVE GENERATOR FOR ULTRASONIC IMAGING SYSTEM

(75) Inventors: Chen-Hua Hu, Taoyuan Hsien (TW); Yow-Ling Gau, Taipei Hsien (TW); Chen-Nan Liao, Chungli (TW)

(73) Assignee: Chung-Shan Institute of Science and Technology, Taoyuan (TW)

( * ) Notice: Subject to any disclaimer, the term of this patent is extended or adjusted under 35 U.S.C. 154(b) by 10 days.

(21) Appl. No.: 09/727,643

(22) Filed: Dec. 1, 2000

(65) Prior Publication Data

US 2002/0031049 A1 Mar. 14, 2002

(51) Int. Cl.[7] ................................................ G03B 42/06
(52) U.S. Cl. .......................................................... 364/11
(58) Field of Search ............................. 567/7, 11, 138, 567/98

(56) References Cited

U.S. PATENT DOCUMENTS 5,323,361 A * 6/1994 Elle ............................. 367/98

* cited by examiner

Primary Examiner—Daniel T. Pihulic
(74) Attorney, Agent, or Firm—J.C. Patents

(57) ABSTRACT

A dynamic delay curve generation method for an ultrasonic imaging system having the following steps: (1) obtaining three initial values of $K_0$, $N_0$ and $\phi_1$ from a parameter decoder, where $K_0$ is the initial delay weighted parameter, $N_0$ is the initial delay cycle number and $$\phi_1 = 1 - \frac{x^2 \cos^2 \theta}{N_0 V^2 T_R \Delta t_0};$$

(2) defining $A=N_0+\phi_1$, $B=1+N_0$, $C=\phi_1$, $D=0$, $E=0$, $K=K_0$; (3) executing $B=B+1$, $D=B+E$, $E=C+2$; (4) determining if $A \leq 0$, and if $A \leq 0$ is false, execute step (5), but if $A \leq 0$ is true, execute step (6); (5) executing $A=A+C$ and then executing step (3) again; and (6) executing $A=A+D$, $C=C+1$ and at the same time executing $K=K+1$, where the delay weighted parameter K is used for controlling the delay of response signal received by each transducer element, and finally executing step (3) again.

7 Claims, 4 Drawing Sheets

DYNAMIC DELAY CURVE GENERATOR FOR ULTRASONIC IMAGING SYSTEM

BACKGROUND OF THE INVENTION

1. Field of Invention

The present invention relates to a dynamic delay curve generator. More particularly, the present invention relates a dynamic delay curve generator for an ultrasonic imaging system.

2. Description of Related Art

Most ultrasonic imaging systems (for example, ultrasonic scanners for medical use) use a transducer array to transform an image to data points. The transducer array consists of a plurality of transducer elements arranged to lie on a straight line or an arc. When a target object is scanned by an ultrasonic scanner, a beam of ultrasound is sent to a particular target point. On hitting the target point, the ultrasound is reflected. Since distances from the target point to each transducer element are different, each transducer element will not receive the echo signal from the target point at the same time. Hence, the reflected signals received by each transducer element must be suitably delayed before combining to form a response signal. The single response signal represents the sum of all ultrasonic energy reflected from the target point.

Each transducer element can be defined as a channel. For example, a transducer array having M transducer elements can be regarded as having M channels. In general, the dynamic delay curve of each transducer element corresponding to the reflected sound beam received can be represented by the following formula:

$$\Delta t = D(x, \theta, R_0) = \frac{-x\sin\theta}{V} + \frac{(x\cos\theta)^2}{V^2 R_0}$$

where, $\Delta t$ is the weighted delay parameter, for controlling the delay after a response signal is received by a transducer element, x is the position of each transducer element, $\theta$ is the beam steering angle, defined as the angle subtended by the line joining the beam reflection point to the center of the transducer array and the vertical center line of the transducer array, V is the speed of the beam, and $R_0$ is the distance from the beam reflecting point to the central point of the transducer array.

FIG. 1 is a graph showing the dynamic delay curve of a transducer element (channel) within an ultrasonic imaging system. As shown in FIG. 1, the beam control angle $\theta$ is fixed. According to the dynamic delay curve formula, the delay parameter $\Delta t$ of a transducer element (corresponding to a particular position x) varies with distance R only. Here, distance R can be represented the number of N delay cycles.

FIG. 2 shows a portion of the beamformer circuit in a conventional ultrasonic imaging system. The beamformer circuit includes a delay generator 20 that corresponds with a transducer or a channel (CH#1), a memory unit 24, an internally plugged circuit 26, an adder 28 and a parameter decoder 22. As shown in FIG. 2, delay generator 20 generates a coarse-tune delay control signal 23 and a fine-tune delay control signal 25 to memory unit 24 and internally plugged circuit 26 according to the output parameters from parameter decoder 22. Control signals 23 and 25 control the delay of response signals received by the transducer element. In other words, coarse-tune control signal 23 and fine-tune control signal 25 are the signals produced by the delay generator 20 after an internal computation using digital dynamic delay weighted parameter K (as shown in FIG. 1).

FIG. 3 is a flow chart showing the steps in generating the dynamic delay curve of a conventional ultrasonic imaging system. Conventionally, a dynamic delay curve is produced using a delay generator like the one shown in FIG. 2. By generating digital delay weighted parameter K that corresponds to a particular transducer element, delay of the response signal received by the said transducer element can be controlled. As shown in FIG. 3, the first step S30 is to define $A=N_0+1-\phi$; $j=1$; $\Delta N=1$, where $$\phi = \frac{x^2\cos^2\theta}{C^2 T_R \Delta t_0}, T_R$$

$T_R$ is sampling cycle, $\Delta t_0$ is fine resolution cycle. In step S32, the condition if $A \leq 0$ is checked. If $A \leq 0$ is true, step S34 is executed setting $A=A+j-\phi$; $\Delta N=\Delta N+1$ followed by executing step S32 again. If $A \leq 0$ is false, step S36 is executed setting $A=A+N0+\Delta N$; $j=j+1$ followed by executing step S34. In addition, when $A \leq 0$ is true, step S35 is also executed setting off the calculation of $K=K+1$. The currently obtained delay weighted parameter K is used for controlling the delay of the response signal received by the transducer element. Hence, according to the dynamic delay curve generation method for a conventional ultrasonic imaging system, a dynamic delay curve corresponding to the transducer element is obtained.

For a conventional dynamic delay current generator (for example, the delay generator shown in FIG. 2), the system must provide 120 Mhz clock if an output result is needed for every 40 MHz. In other words, a conventional beamformer design needs to have two groups of clock signals (40 MHz and 120 MHz). The first group (40 MHz) serves as signals for general signal sampling. The second group (120 MHz) is used for generating the dynamic delay curve of delay generator 20. However, having two groups of different clock signals in a system not only will increase system complexity, but will also lead to system instability.

SUMMARY OF THE INVENTION

Accordingly, one object of the present invention is to provide a dynamic delay curve generation method in an ultrasonic imaging system. The ultrasonic imaging system includes a transducer array that comprises of a plurality of transducer elements. Each transducer element corresponds to a position x. The angle between a line joining a beam reflection point to the center of the transducer array and the vertical centerline of the transducer array is defined to be $\theta$; the sampling cycle is defined to be $T_R$; fine resolution cycle is defined to be $\Delta t_0$; and, beam speed is defined to be V. The ultrasonic imaging system also includes a parameter decoder. The dynamic delay curve generation method that corresponds to each transducer element includes at least the following steps: (1) obtaining three initial values of $K_0$, $N_0$ and $\phi_1$ from the parameter decoder, where $$\phi_1 = 1 - \frac{x^2 \cos^2\theta}{N_0 V^2 T_R \Delta t_0};$$

(2) defining $A=N_0+\phi_1$, $B=1+N_0$, $C=\phi_1$, $D=0$, $E=0$, $K=K_0$; (3) executing $B=B+1$, $D=B+E$, $E=C+2$; (4) judging if $A \leq 0$, and if $A \leq 0$ is false, execute step (5), on the contrary, if $A \leq 0$ is true, execute step (6); (5) executing $A=A+C$ and then executing step (3) again; and (6) executing $A=A+D$, $C=C+1$ and at the same time executing K=K+1, where the delay weighted parameter K is used for controlling the delay of response signal received by each transducer element, finally executing step (3) again.

This invention also provides a dynamic delay curve generator in an ultrasonic imaging system. The ultrasonic imaging system includes a transducer array that having a plurality of transducer elements. Each transducer element corresponds to a position x. The angle between a line joining a beam reflection point to the center of the transducer array and the vertical centerline of the transducer array is defined to be θ; the sampling cycle is defined to be $T_R$; fine resolution cycle is defined to be $\Delta t_0$; and, beam speed is defined to be V. The ultrasonic imaging system further includes a parameter decoder for providing three initial values $K_0$, $N_0$ and $\phi_1$, where $K_0$ is the initial delay weighted parameter, $N_0$ is the initial delay cycle number and $$\phi_1 = 1 - \frac{x^2 \cos^2 \theta}{N_0 V^2 T_R \Delta t_0}.$$

The dynamic delay curve generator includes at least a first logic circuit, a memory circuit, a second logic circuit, a decision circuit, a third logic circuit, a fourth logic circuit and a fifth logic circuit. The first logic circuit receives the three initial parameters $K_0$, $N_0$ and $\phi_1$ from the parameter decoder for carrying out computations including A=$N_0$+$\phi_1$, B=1+$N_0$, C=$\phi_1$, D=0, E=0, K=$K_0$, and then outputs a first enable control signal. The memory circuit is used for holding the variables A, B, C, D, E and K. The second logic circuit receives the first enable control signal and executes computations including B=B+1, D=B+E and E=C+2. The newly obtained results are transferred to the memory circuit for storage and then a second enable control signal is issued. The decision circuit receives the second enable control signal and checks if the value of A stored in the memory circuit is smaller than or equal to zero. If A≦0 is false, a third enable control signal is issued. On the contrary, if A≦0 is true, a fourth enable control signal is issued. The third logic circuit receives the third enable control signal and then executes the computation A=A+C. The newly obtained results are transferred to the memory circuit and a fifth enable control signal is sent to the second logic circuit. Hence, the second logic circuit can compute B=B+1, D=B+E and E=C+2 and output the second enable control signal again. The fourth logic circuit receives the fourth enable control signal and executes computations A=A+D and C=C+1. The results of the computations are sent to the memory circuit. A sixth enable control signal is transmitted to the second logic circuit so that the second logic circuit can compute B=B+1, D=B+E and E=C+2 and output the second enable control signal again. The fifth logic circuit receives the fourth enable logic circuit and executes the computation K=K+1. The results of the computation are sent to the memory circuit for storage. The variable K is used for controlling the delay of the response signal received by a corresponding transducer element.

In applying the invention to an ultrasonic imaging system, only a single clock signal frequency (40 MHz) is required. Hence, using the dynamic delay curve generation method and installation of this invention, complexity of the ultrasonic imaging system is reduced and operating stability is improved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
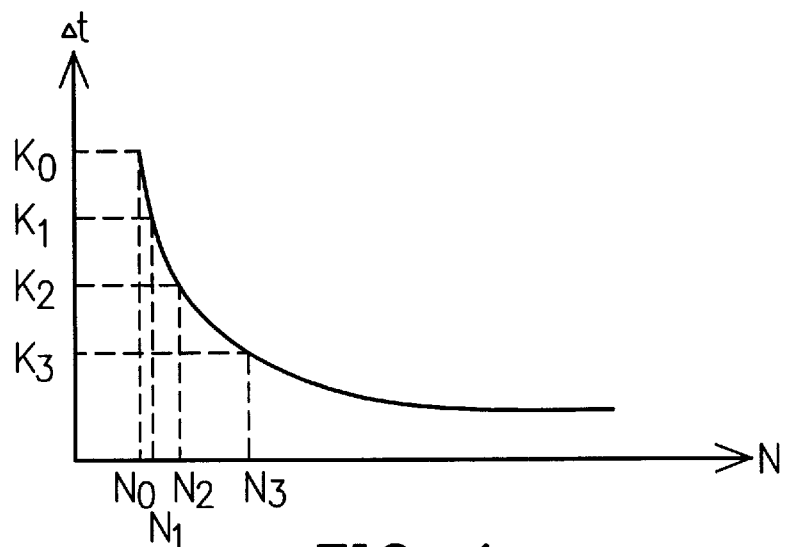
FIG. 1 is a graph showing the dynamic delay curve of a transducer element (channel) within an ultrasonic imaging system.
Figure 2:
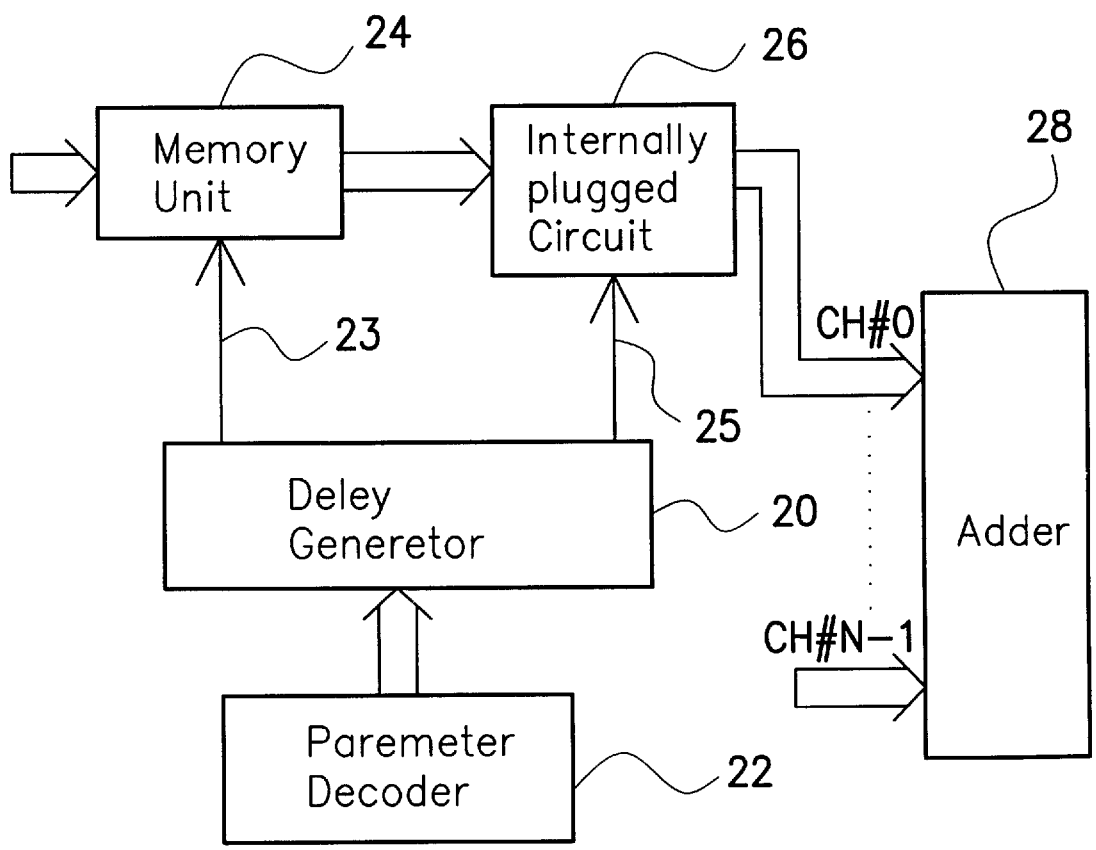
FIG. 2 shows a portion of the beamformer circuit in a conventional ultrasonic imaging system.
Figure 3:
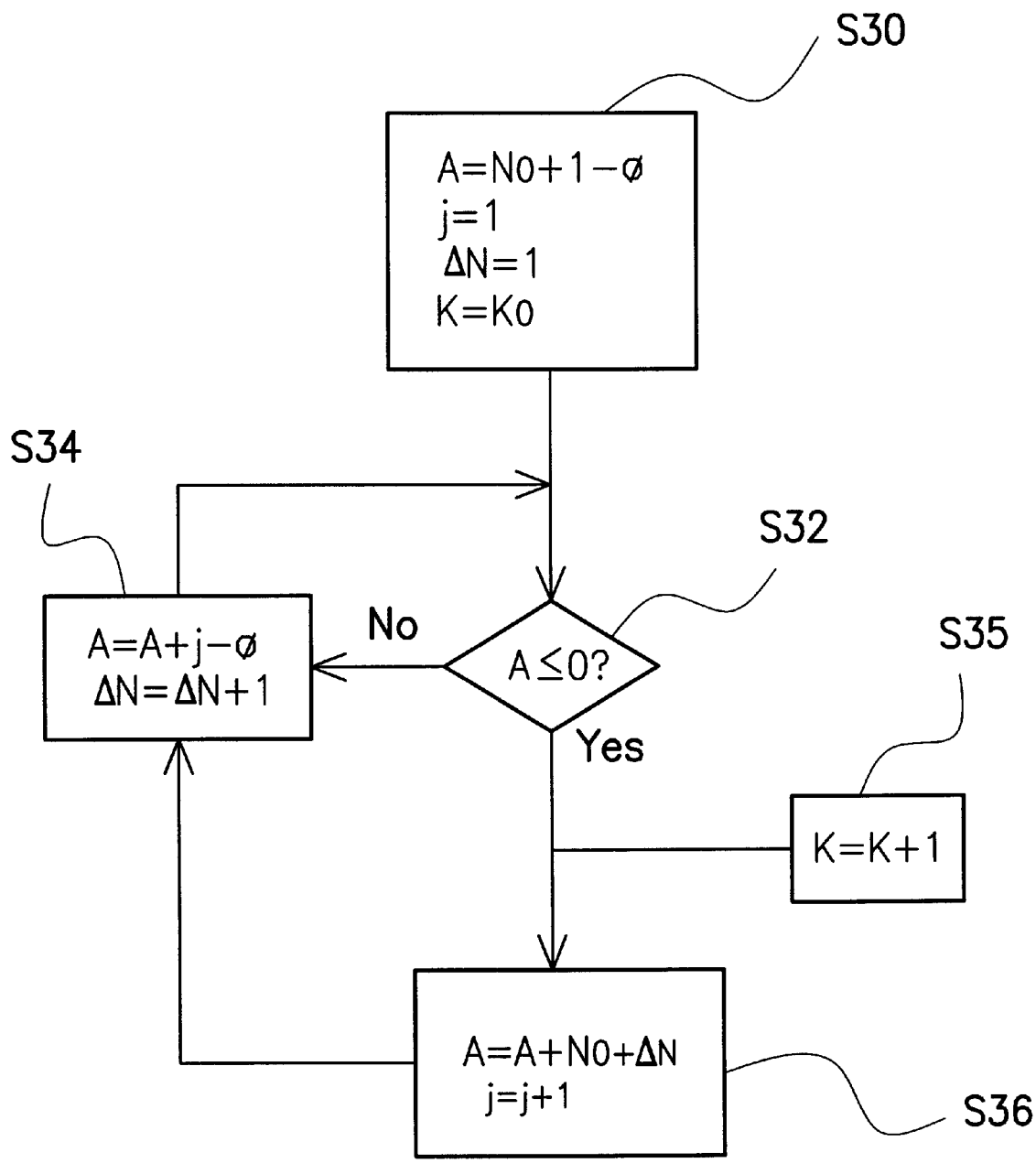
FIG. 3 is a flow chart showing the steps in generating the dynamic delay curve of a conventional ultrasonic imaging system.

Reference will now be made in detail to the present preferred embodiments of the invention, examples of which are illustrated in the accompanying drawings. Wherever possible, the same reference numbers are used in the drawings and the description to refer to the same or like parts.

Figure 4:
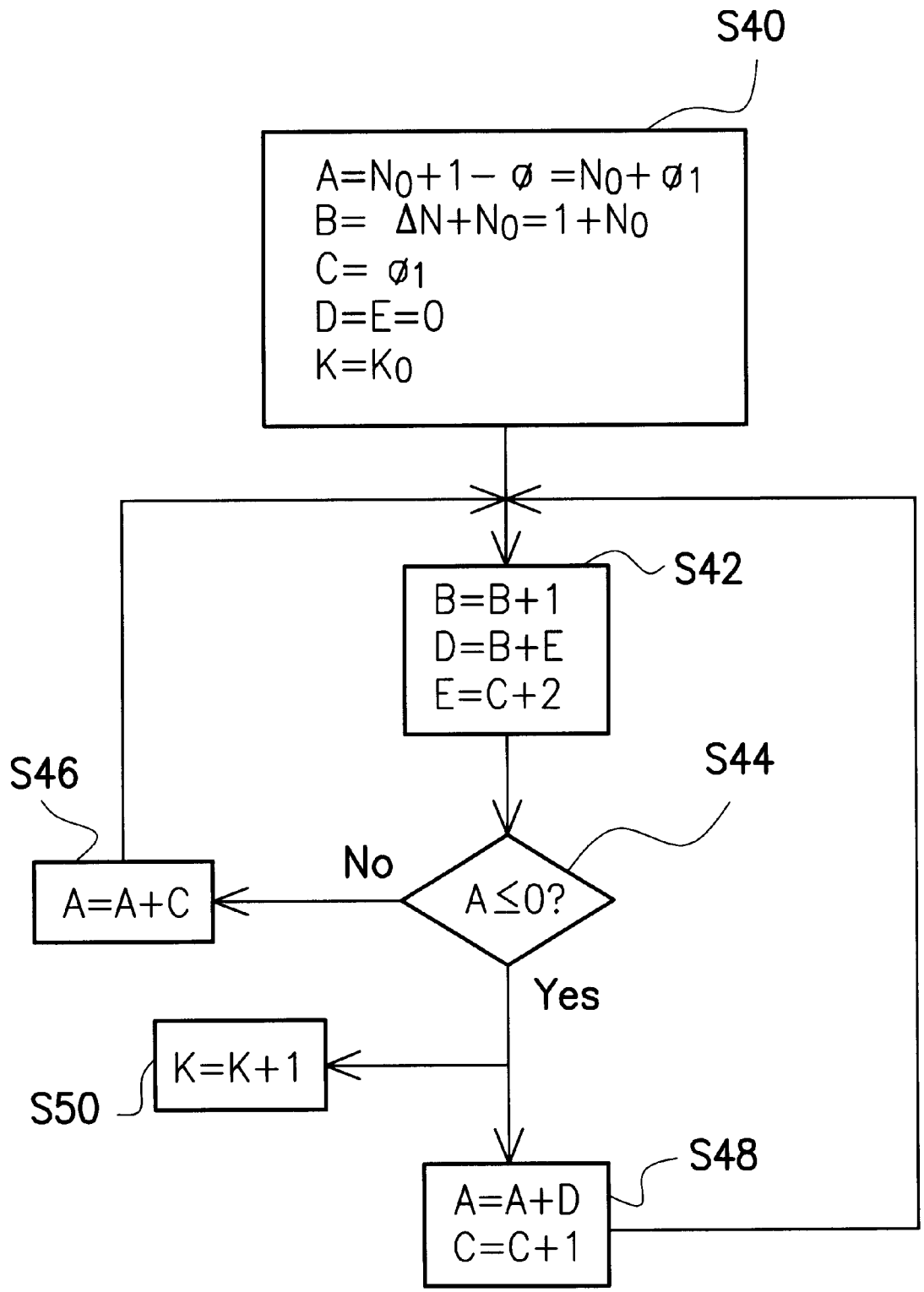
FIG. 4 is a flow chart showing the steps in generating the dynamic delay curve of an ultrasonic imaging system according to this invention.

FIG. 4 is a flow chart showing the steps in generating the dynamic delay curve of an ultrasonic imaging system according to this invention. The ultrasonic imaging system includes a transducer array that having a plurality of transducer elements. Each transducer element corresponds to a position x. The angle between a line joining a beam reflection point to the center of the transducer array and the vertical centerline of the transducer array is defined to be θ; the sampling cycle is defined to be $T_R$; fine resolution cycle is defined to be $\Delta t_0$; and, beam speed is defined to be V. The ultrasonic imaging system also includes a parameter decoder for providing three initial values $K_0$, $N_0$ and $\phi_1$, where $K_0$ is the initial delay weighted parameter, $N_0$ is the initial delay cycle number and $$\phi_1 = 1 - \frac{x^2 \cos^2 \theta}{N_0 V^2 T_R \Delta t_0}.$$

As shown in FIG. 4, the dynamic delay curve generation method that corresponds to each transducer element includes the following steps. First, in step S40, parameters A, B, C, D, E and K are defined to be A=$N_0$+$\phi_1$, B=1+$N_0$, C=$\phi_1$, D=0, E=0, K=$K_0$. In step S42, computations B=B+1, D=B+E, E=C+2 are executed. In step S44, the value of A is checked to determine if A≦0. If A≦0 is false, step S46 is executed next to compute A=A+C followed by step S42 again. On the contrary, if A≦0 is true, step S48 is executed next to compute A=A+D and C=C+1 followed by step S42 again. Meanwhile, the computation K=K+1 is also executed in step S50. Here, the delay weighted parameter K is used for controlling the delay of the response signal received by each transducer element.

Figure 5:
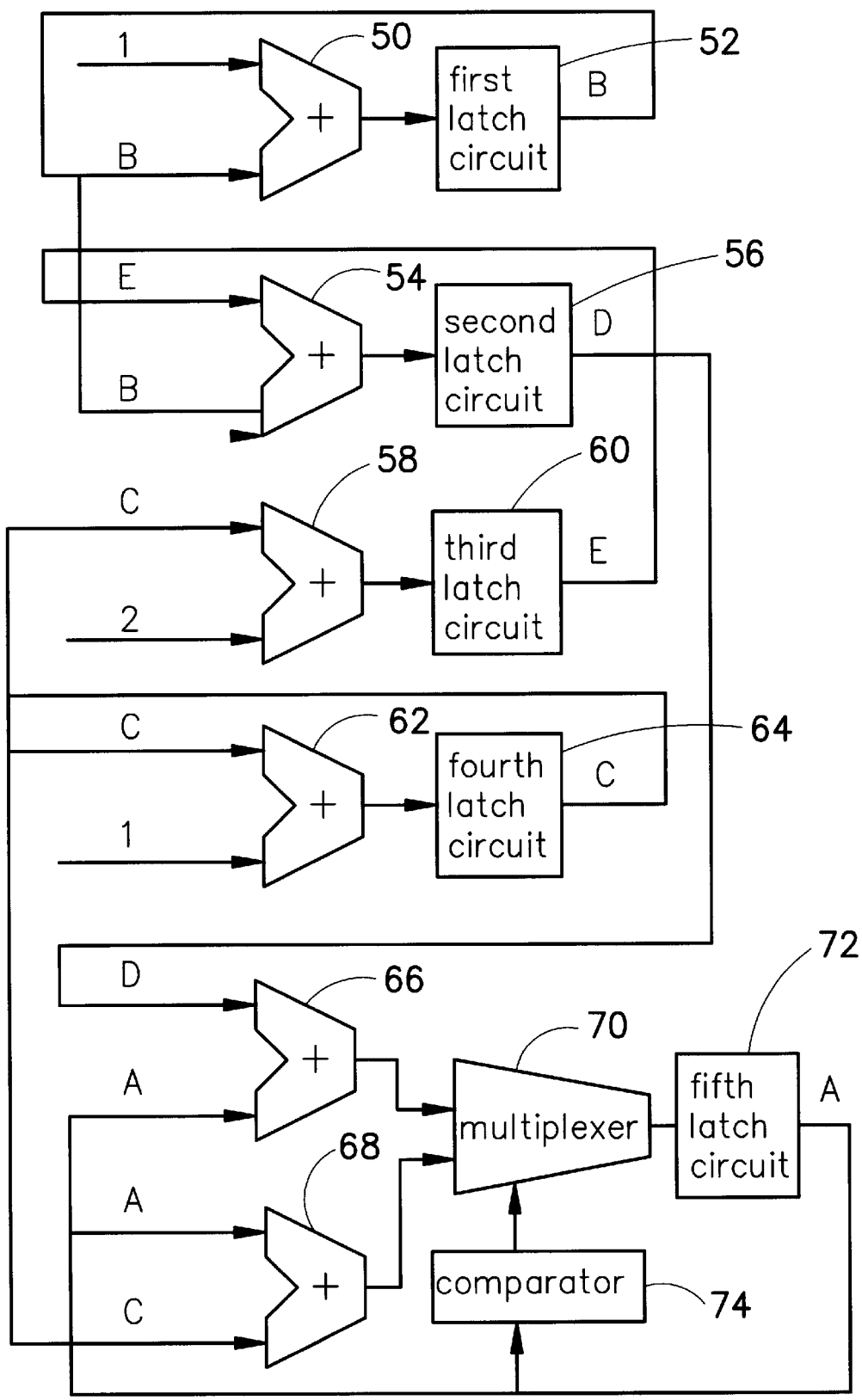
FIG. 5 is a block diagram showing a dynamic delay curve generator according to this invention.

FIG. 5 is a block diagram showing a dynamic delay curve generator according to this invention. The ultrasonic imaging system includes a transducer array that having a plurality of transducer elements. Each transducer element corresponds to a position x. The angle between a line joining a beam reflection point to the center of the transducer array and the vertical centerline of the transducer array is defined to be θ; the sampling cycle is defined to be $T_R$; fine resolution cycle is defined to be $\Delta t_0$; and, beam speed is defined to be V. The ultrasonic imaging system further includes a parameter decoder for providing three initial values $K_0$, $N_0$ and $\phi_1$, where $K_0$ is the initial delay weighted parameter, $N_0$ is the initial delay cycle number and $$\phi_1 = 1 - \frac{x^2\cos^2\theta}{N_0 V^2 T_R \Delta t_0}.$$

As shown in FIG. 5, the dynamic delay curve generator of this invention includes a first logic circuit 50, a second logic circuit 52, a memory circuit (for example, a register) 51, a decision circuit 54, a third logic circuit 56, a fourth logic circuit 58 and a fifth logic circuit 60. First logic circuit 50 receives the three initial parameters $K_0$, $N_0$ and $\phi_1$ from the parameter decoder (not shown in the figure) for carrying out computations including A=$N_0$+$\phi_1$, B=1+$N_0$, C=$\phi_1$, D=0, E=0, K=$K_0$, and then outputs a first enable control signal C1. Memory circuit 51 is used for holding the variables A, B, C, D, E and K. Second logic circuit 52 receives the first enable control signal C1 and executes computations including B=B+1, D=B+E and E=C+2. The newly obtained results are transferred to memory circuit 51 for storage and then a second enable control signal C2 is issued. Decision circuit 54 receives the second enable control signal C2 and checks if the value of A stored in memory circuit 51 is smaller than or equal to zero. If A≦0 is false, a third enable control signal C3 is issued. On the contrary, if A≦0 is true, a fourth enable control signal C4 is issued.

In addition, third logic circuit 56 receives the third enable control signal C3 and then executes the computation A=A+C. The newly obtained results are transferred to memory circuit 51 and a fifth enable control signal C5 is sent to second logic circuit 52. Hence, second logic circuit 52 can compute B=B+1, D=B+E and E=C+2 and output the second enable control signal C2 again. Fourth logic circuit 58 receives the fourth enable control signal C4 and executes computations A=A+D and C=C+1. The results of the computations are sent to memory circuit 51. A sixth enable control signal C6 is transmitted to second logic circuit 52 so that second logic circuit 52 can compute B=B+1, D=B+E and E=C+2 and output the second enable control signal C2 again. Fifth logic circuit 60 receives the fourth enable logic signal C4 and executes the computation K=K+1. The results of the computation are sent to memory circuit 51 for storage. The variable K is used for controlling the delay of the response signal received by a corresponding transducer element.

Compared with the conventional technique, each adding computation in the dynamic delay curve generator of this invention involves only two numbers. Therefore, a computation result can be output for every 40 MHz. In other words, when the invention is applied to an ultrasonic imaging system, only a single clock signal frequency (40 MHz) is required. Hence, using the dynamic delay curve generation method and installationcan reduce the complexity of the ultrasonic imaging system and improve its operating stability.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dynamic delay curve generation method for an ultrasonic imaging system that includes a transducer array having a plurality of transducer elements with each transducer element corresponding to a position x, wherein the angle between a line joining a beam reflection point to the center of the transducer array and the vertical centerline of the transducer array is defined as θ, the sampling cycle is defined as $T_R$, the fine resolution cycle is defined as $\Delta t_0$, and beam speed is defined as V, and that the ultrasonic imaging system also includes a parameter decoder, comprising the steps of:

(1) obtaining three initial values of $K_0$, $N_0$ and $\phi_1$ from the parameter decoder, where $K_0$ is the initial delay weighted parameter, $N_0$ is the initial delay cycle number and $$\phi_1 = 1 - \frac{x^2\cos^2\theta}{N_0 V^2 T_R \Delta t_0}$$

(2) defining A=$N_0$+$\phi_1$, B=1+$N_0$, C=$\phi_1$, D=0, E=0, K=$K_0$;
(3) executing B=B+1, D=B+E, E=C+2;
(4) determining if A≦0, and if A≦0 is false, executing step (5), on the contrary, if A≦0 is true, executing step (6);
(5) executing A=A+C and then executing step (3) again; and
(6) executing A=A+D, C=C+1 and at the same time executing K=K+1, where the delay weighted parameter K is used for controlling the delay of response signal received by each transducer element, finally executing step (3) again.

2. The method of claim 1, wherein the plurality of transducer elements are arranged to lie on a straight line.

3. The method of claim 1, wherein the plurality of transducer elements are arranged to lie on an arc.

4. A dynamic delay curve generator for an ultrasonic imaging system that includes a transducer array having a plurality of transducer elements with each transducer element corresponding to a position x, wherein the angle between a line joining a beam reflection point to the center of the transducer array and the vertical centerline of the transducer array is defined as θ, the sampling cycle is definedas $T_R$, the fine resolution cycle is defined $\Delta t_0$, and beam speed is defined as V, and that the ultrasonic imaging system also includes a parameter decoder for providing three initial values of $K_0$, $N_0$ and $\phi_1$, where $K_0$ is the initial delay weighted parameter, $N_0$ is the initial delay cycle number and $$\phi_1 = 1 - \frac{x^2\cos^2\theta}{N_0 V^2 T_R \Delta t_0},$$

comprising:
a first logic circuit receiving the three initial parameters $K_0$, $N_0$ and $\phi_1$ from the parameter decoder for carrying out computations including A=$N_0$+$\phi_1$, B=1+$N_0$, C=$\phi_1$, D=0, E=0, K=$K_0$, and then outputs a first enable control signal;
a memory circuit for holding the variables A,B,C,D,E and K;
a second logic circuit for receiving the first enable control signal and executing computations including B=B+1, D=B+E and E=C+2, storing the newly obtained results in the memory circuit and then issuing a second enable control signal;

a decision circuit for receiving the second enable control signal and checking if the value of A stored in memory circuit is smaller than or equal to zero, if $A \leq 0$ is false, a third enable control signal is issued, but if $A \leq 0$ is true, a fourth enable control signal is issued;

a third logic circuit for receiving the third enable control signal and then executing the computation A=A+C, storing the newly obtained results in the memory circuit and then issuing a fifth enable control signal to the second logic circuit so that the second logic circuit can compute B=B+1, D=B+E and E=C+2 and output the second enable control signal again;

a fourth logic circuit for receiving the fourth enable control signal and executing computations A=A+D and C=C+1, storing the newly obtained results in the memory circuit and then issuing a sixth enable control signal to the second logic circuit so that the second logic circuit can compute B=B+1, D=B+E and E=C+2 and output the second enable control signal again; and a fifth logic circuit for receiving the fourth enable logic signal and executing the computation K=K+1, and storing the newly obtained results of the computation to memory circuit, wherein the variable K is used for controlling the delay of the response signal received by a corresponding transducer element.

5. The generator of claim 4, wherein the plurality of transducer elements are arranged to lie on a straight line.

6. The generator of claim 4, wherein the plurality of transducer elements are arranged to lie on an arc.

7. The generator of claim 4, wherein the memory circuit includes a register.

\* \* \* \* \*